United States Patent [19]
Hashimoto et al.

[11] 3,895,863
[45] July 22, 1975

[54] ELECTROMAGNETIC RELEASE DEVICES FOR CAMERAS

[75] Inventors: Teiji Hashimoto, Kawasaki; Tomoshi Takigawa; Toshikazu Ichiyanagi, both of Tokyo, all of Japan

[73] Assignee: Canon Kabushiki Kaisha, Tokyo, Japan

[22] Filed: Feb. 6, 1974

[21] Appl. No.: 439,906

[30] Foreign Application Priority Data
  Feb. 12, 1973   Japan................................ 48-17156
  Feb. 12, 1973   Japan................................ 48-17157
  Feb. 12, 1973   Japan................................ 48-17158

[52] U.S. Cl.............................. 352/176; 352/169
[51] Int. Cl. ......................................... G03b 21/38
[58] Field of Search..................... 352/176, 177, 169

[56] References Cited
UNITED STATES PATENTS
3,722,989   3/1973   Inoue............................. 352/177 X Primary Examiner—Monroe H. Hayes
Attorney, Agent, or Firm—William R. Woodward

[57] ABSTRACT

An electromagnetic release device for cameras which may selectively be operated continuously comprises a motor circuit, a first switching means adapted to turn the motor circuit on or off, a stopper mechanism adapted to stop a shutter shaft at a predetermined angular position, and a control circuit adapted to control the stopper mechanism. The control circuit comprises a timer circuit, a second switching means adapted to be opened after a predetermined time by the timer circuit, a first solenoid connected to the second switching means and a second solenoid with a resistance higher than that of the first solenoid and adapted to be energized in response to the actuation of the first switching means. In response to the shutter release operation the first switching means is turned on to energize the first and second solenoids, and the first switching means is turned off after a predetermined time so that only the second solenoid is energized for the remainder of the operation.

26 Claims, 25 Drawing Figures

PATENTED JUL 22 1975 3,895,863

SHEET 1

ELECTROMAGNETIC RELEASE DEVICES FOR CAMERAS

BACKGROUND OF THE INVENTION

1. Field of the Invention

The present invention relates to an electromagnetic release device for a camera and more particularly to those of the type disclosed in the same applicant's Japanese Pat. No. 18733/1964 and U.S. Pat. No. 3,598,480.

2. Description of the Prior Art

Of various electromagnetic shutter release devices proposed so far, those disclosed in the above patents are of the type for stopping a shutter blade always at a predetermined angular position after the shutter release operation. However, these devices have a common defect that the power consumption is greater when stopper means, which stops a shutter blade, is released for continuous photography. In the electromagnetic shutter release device disclosed in U.S. Pat. No. 3,598,480, a pair of release switches are interlocked. Therefore, this device has the defects that the contamination of the contacts of the release switches by sparks will lead to a malfunction and, furthermore, that the device becomes very complex in construction when it is designed so as to be connected to a remote control device.

SUMMARY OF THE INVENTION

One of the objects of the present invention is therefore to provide an improvement of the electromagnetic shutter release devices disclosed in Japanese Pat. No. 18733/1964 and in U.S. Pat. No. 3,598,480.

Another object of the present invention is to provide an electromagnetic release device in which the power required for releasing stopper means, which stops a shutter blade, may be minimized during continuous photography.

Another object of the present invention is to provide an electromagnetic release device simple in construction which may stop a shutter blade at a predetermined angular position when motor driving is interrupted.

Another object of the present invention is to provide a control circuit and a control mechanism for an electromagnetic release device which minimizes the number of contacts whose contamination by sparks leads to a malfunction, thereby reducing the cost of the device.

Another object of the present invention is to provide a control circuit and a control mechanism for an electromagnetic release device which enables the latter to be remote controlled by the attachment of a simple device.

The above and other objects, features and advantages of the present invention will become more apparent from the following description of some preferred embodiments thereof taken in conjunction with the accompanying drawing.

DESCRIPTION OF THE PREFERRED EMBODIMENTS

Figure 1:
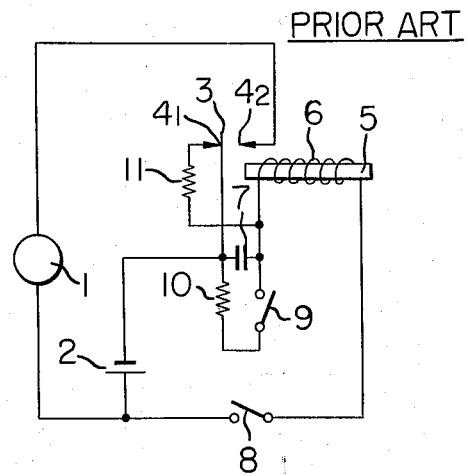
FIG. 1 is a diagram of a control circuit of an electromagnetic shutter release device disclosed in Japanese Pat. No. 18733/1964.
Figure 2:
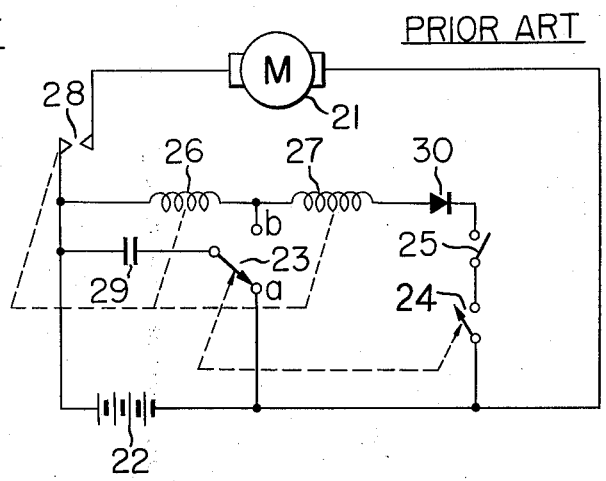
FIG. 2 is a diagram of a control circuit for an electromagnetic shutter release device disclosed in U.S. Pat. No. 3,598,480.

Prior Art, FIGS. 1 and 2

Prior to the description of the electromagnetic release devices in accordance with the present invention, the prior art predecessors thereof, which are disclosed in Japanese Pat. No. 18733/1964 and U.S. Pat. No. 3,598,480, will be briefly described.

FIG. 1 is a diagram of a drive control circuit for a electromagnetic release device disclosed in Japanese Pat. No. 18733/1964. In FIG. 1, reference numeral 1 denotes a motor; 2, a power supply; 3, an armature interposed in a motor circuit interconnecting between the motor 1 and the power supply 2; $4_1$ and $4_2$, contacts of the armature 3; 5, an electromagnet for actuating the armature 3; 6, a solenoid of the electromagnet 5; 7, a capacitor connected in series to the solenoid 6; and 8, a release switch inserted between the power supply 2 and the solenoid 6 connected thereto in parallel with the motor 1. A series circuit consisting of a selection switch 9 and a resistor 10 is connected in parallel with the capacitor 7, and a resistor 11 for discharging the capacitor 7 is inserted between the solenoid 6 and the contact $4_1$.

When the selection switch 9, which selects either the continuous photography mode or single-frame photography mode, is closed while the release switch 8 is closed, the current from the power supply 2 flows through the solenoid 6, the resistors 10 and 11 and the capacitor 7. Therefore, the electromagnet 5 is energized to attract the armature 3 so that the contact $4_1$ is opened while the contact $4_2$ is closed. As a result the motor 1 is driven. After the capacitor 7 has been charged, no current flows into it so that the current flowing through the solenoid 6 is decreased to the current flowing through the resistor 10. In order to attract the armature 3, the large current is required, but once the armature 3 is attracted, the less current is required to keep the electromagnet 5 attracting the armature 3. The magnitude of this current is controlled by the resistor 10. As far as the switch 8 is closed, the motor 1 is kept driven so that continuous photography may be carried out.

In case of the single-frame mode, the selection switch 9 is kept opened while the release switch 8 is closed. The current flows from the power supply or battery 2 through the solenoid 6, the capacitor 7 and the resistor 11. Therefore, the electromagnet 5 attracts the armature 3 to close the contact $4_2$. As a result the motor is driven to drive the camera. However, the capacitor 7 is soon charged so that the current flowing through the solenoid is decreased. Therefore, the electromagnet 5 cannot attract the armature 3 so that the contact $4_2$ is opened to stop the motor 1. The inductance of the solenoid 6 and the capacitance of the capacitor 7 may be so selected as to cause the motor 1 to drive only for a time required for shooting one frame. When the armature 3 is made into contact with the contact $4_1$, the capacitor 7 is charged through the resistor 11 so that the next shooting may be ready.

The value of the resistor 11 is so selected that when the release switch 8 is kept depressed, the current flowing through the solenoid 6 and the resistor 11 cannot sufficiently energize the electromagnet 5 to attract the armature 3.

FIG. 2 shows a diagram of a drive control circuit for a electromagnetic release device disclosed in U.S. Pat. No. 3,598,480. In FIG. 2, reference numeral 21 denotes a motor; 22, a power supply; 23 and 24; interlocked release switches; 26 and 27, solenoids; 29, a capacitor; 30, a diode; 25, a switch which is opened in case of the single-frame photography mode but is closed in case of the continuous photography mode; and 28, a switch which is actuated in unison with a member for stopping a shutter-blade shaft (not shown) by the solenoids 26 and 27.

In the continuous photography mode in which the switch 25 is closed, the release switch 23 is so actuated as to close its contact $a$ while opening the contact $b$, and then the release switch 24 is closed. Then the capacitor 29 is discharged through the solenoid 26 so that a stopper (not shown) which has kept the switch 28 in the OFF state is released so that the motor 21 is driven. Even after the capacitor 29 has been discharged, small current flows through the solenoids 26 and 27, the diode 30 and the switches 25 and 24 so that the stopper is released and the switch 28 remains in the ON state. Thus, the motor 21 continues driving for continuous photography.

To interrupt continuous photography, the release switches 23 and 24 are turned off to deenergize the solenoids 26 and 27 so that the stopper is actuated to turn off the switch 28, thereby stopping the motor 21.

In case of the single-frame photography mode, the release switch 23 is so actuated as to open the contact $a$ but to close the contact $b$ while the switch 25 is closed. When the release switch 24 is closed, the capacitor 29 is discharged through the solenoid 26. Therefore, the stopper is released to turn on the switch 28, so that the motor 21 is driven. After the capacitor 29 has been discharged, no current flows through the solenoid 26 so that the stopper is returned to its normal position to turn off the switch 28 so that the motor 21 is stopped. Thus, one single-frame photography is completed. The value of the capacitor 29 is so selected to permit the motor 21 to drive only for one single-frame photography.

THE PRESENT INVENTION

First Embodiment, FIGS. 3-10

Figure 3:
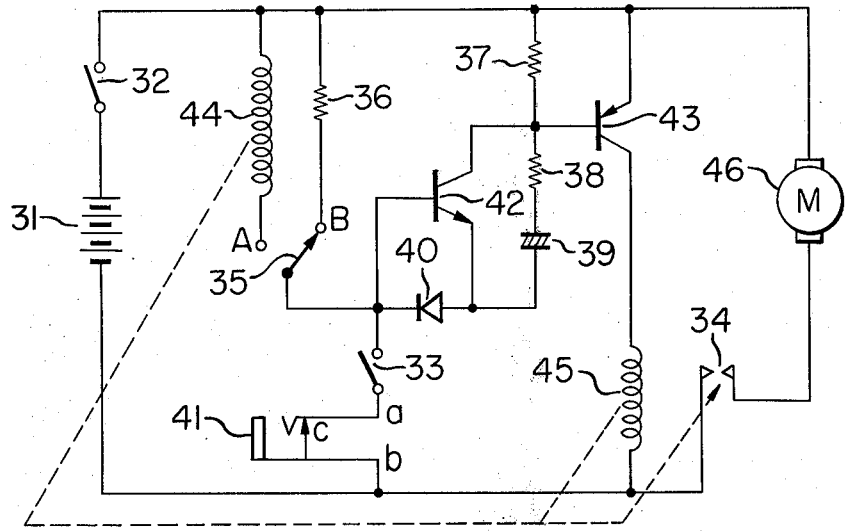
FIG. 3 is a diagram of a first embodiment of a control circuit of an electromagnetic release device in accord with the present invention.

Now referring to FIG. 3 illustrating the first embodiment of the present invention, reference numeral 31 denotes a power supply; 32, a main switch; 33, a release switch; 34, a switch which is interlocked with stopper means to be described hereinafter; 35, a selection switch for selecting either single-frame mode or continuous mode depending upon whether contact B or A is closed; 36, 37 and 38, resistors; 39, capacitor; 40, a diode; 41, a remote-control jack; 44 and 45, solenoids of an electromagnet of the stopper means to be described hereinafter with the resistance of the solenoid 44 being greater than that of the solenoid 45; and 42, an NPN transistor;

When the switch 33 is opened, the capacitor 39 is discharged through the resistor 36, the transistor 42 and the diode 40. The diode 40 is inserted in order to keep the base potential of the transistor 42 higher than the emitter potential when the release switch 33 is opened.

Stopper Means, FIGS. 5-10

The mechnical construction of the stopper means is illustrated in detail in FIGS. 5-10. An electromagnet generally indicated by 55 and comprising a core 56 and the solenoids 44 and 45 (see FIG. 3) is supported by a yoke 51 securely joined to a cine camera main body 60 with screws 52. A crank-shaped armature 53 which is loosely fitted into a slit $51a$ of the yoke 51 has a stopper section $53a$, an intermediate section $53b$ and a bufurcated rear end portion with branched arms $53c$ and $53d$. The branched arm $53c$ is provided with a spacer 54, and the branched arm $53d$ is provided with a hole $53e$ which engages with one end of a spring 65 whose other end is engaged with a projection 57 extended from the yoke 51 so that the armature 53 may be normally biased to rotate about the slit $51a$ of the yoke 51 in the clockwise direction. A spacer 61 is attached to the intermediate section or portion $53b$ of the armature 53 in opposed relation of one end of the core 56.

Figure 5:
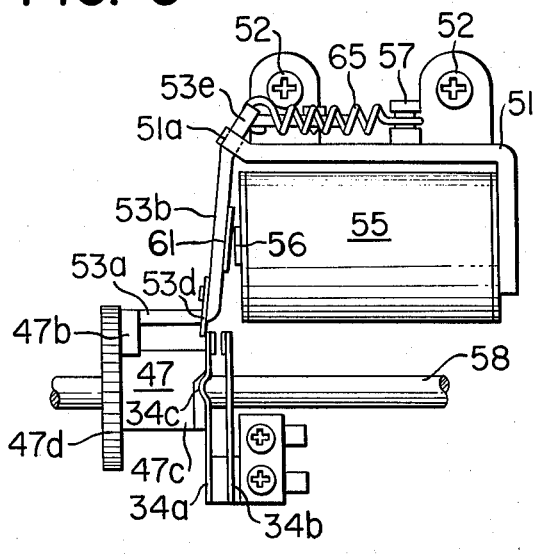
FIG. 5 is a front view of a first embodiment of stopper means used with the control circuit shown in FIG. 3.
Figure 7:
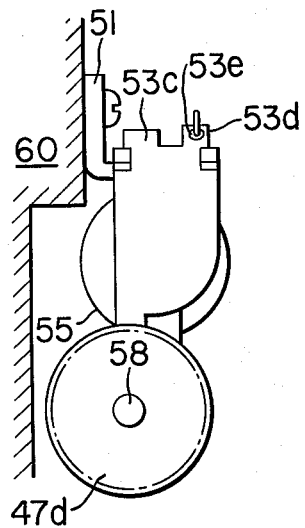
FIG. 7 is a left-side view of the stopper means shown in FIG. 5.
Figure 6:
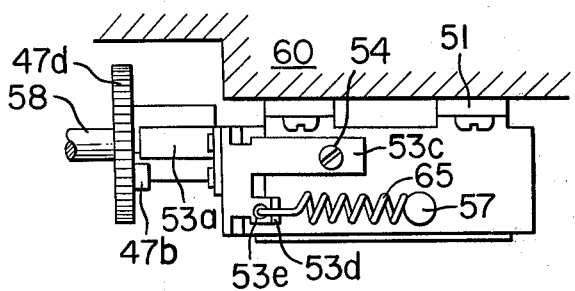
FIG. 6 is an upper-side view of the stopper means shown in FIG. 5.
Figure 8:
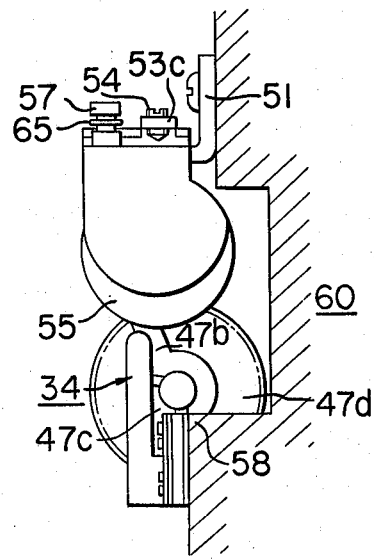
FIG. 8 is a right-side view of the stopper means shown in FIG. 5.
Figure 9:
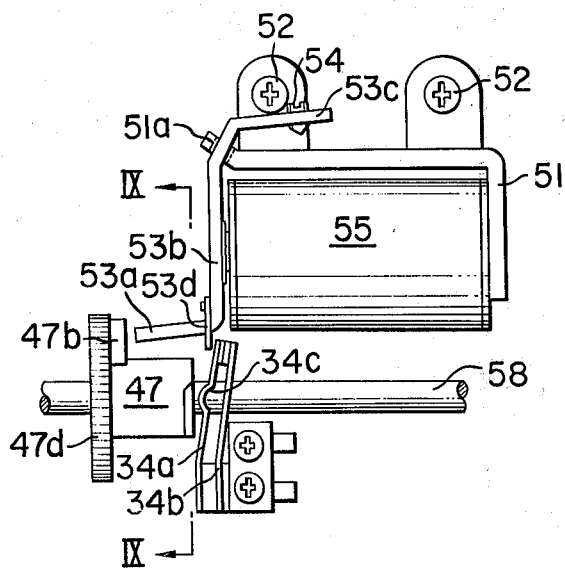
FIG. 9 is a view similar to FIG. 5 with the stopper means being released.
Figure 10:
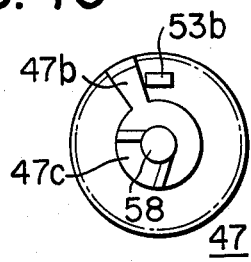
FIG. 10 is a view looking in the direction indicated by the arrow IX—IX in FIG. 9 and illustrating in detail a cam member of stopper means.

The switch 34 (see FIG. 3) has a pair of contacts 34 and $34b$ which are normally spaced apart from each other as shown in FIG. 5 but are made into contact with each other as shown in FIG. 9 by an actuating member 53d fixed to the armature 53 when the latter is attracted by the electromagnet 55. The contact 34a has a projection or curved portion 34c.

A shaft 58 carrying a shutter blade (not shown) also carries a gear 47d and a stopper cam member 47 which has a cam groove 47c and a stopper 47b which engages with the stopper section or portion 53a of the armature 53 when the shutter is stopped. When the switch 34 is turned off, the projection 34c of the contact 34a engages with the cam groove 47c so that the shaft 58 may be stopped at a predetermined angular position and the stopper 47b may be prevented from being sprung back when it engages with the stopper portion 53a of the armature 53.

When the control circuit shown in FIG. 3 is not energized, the electromagnet 55 is not energized as shown in FIG. 5. Therefore, the root portion of the armature 53 is held close to the yoke 51 under the force of the spring 65 while the stopper section or portion 53a is moved away from the yoke 51 and is in engagement with the stopper 47b. The projection 34c of the contact 34a is also put into engagement with the cam groove 47c of the cam member 47.

In the single-frame photography mode, the selection switch 35 is switched to close the contact B while the main switch 32 as well as the release switch 33 are closed. The current flows from the power supply 31 through the resistor 37, the resistor 38, the capacitor 39, the diode 40, the release switch 33 and the jack 41 and thus PNP transistor 43 is rendered conductive. Therefore the current also flows through the transistor 43 and the solenoid 45 of the electromagnet 55. Therefore the electromagnet 55 is energized to attract the intermediate portion 53b of the armature 53 to the core 56 against the spring 69 so that the stopper portion 53a is released from the stopper 47b of the cam member 47. The contact 34a is also displaced to make contact with the contact 34b so that the switch 34 is closed. The motor 46 is driven to rotate the shaft 58. At this time, a large current flows through the transistor 43 and the solenoid 45 to charge the capacitor 39.

The control circuit is so designed that when one single-frame photography is completed, the capacitor 39 is completely charged. Therefore, no current flows into the base of the transistor 43 so that no current flows through the solenoid 45. As a result the electromagnet is de-energized so that the armature 53 is returned to its inoperative position under the force of the spring 65. The stopper portion 53a of the armature 53 engages again with the stopper 47b while the projection 34c of the contact 34a engages with the cam groove 47c. The switch 34 is therefore turned off so that the motor 46 is stopped and the shaft 58 is also stopped as its initial angular position. Thus, one single-frame of photography is completed.

As soon as the switch 34 is turned off, the capacitor 39 is partly discharged through the resistors 38, 37 and 36 and the base of the transistor 42. Therefore the transistor 42 is made conducting so that the capacitor 39 is discharged through the resistor 38 and the collector of the transistor 42.

In the continuous photography mode, the selection switch 35 is switched to close the contact A while the main switch 32 as well as the release switch 33 are also closed. The current flows from the power supply 31 through the solenoid 44, the release switch 33 and the jack 41 and also flows through the resistor 37, the resistor 38, the capacitor 39, the diode 40, the release switch 33 and the jack 41 and thus the transistor 43 is rendered conductive. Therefore current flows through the solenoid 45 of the electromagnet 55 of the stopper means. As with the case of the single-frame photography mode, the switch 34 is closed so that the motor 46 is driven.

In this condition, a large current flows through the transistor 43 and the solenoid 45 into the capacitor 39. Therefore as soon as one single-frame photography has been completed, the capacitor 39 is charged so that no current flows into the base of the transistor 43. Therefore the transistor is rendered non-conductive and no current flows through the solenoid 45, but a small current keeps flowing through the solenoid 44, the switch 35, the release switch 33 and the jack 41 so that the switch means keeps the switch 34 turned on. Therefore the motor 46 keeps driving. That is, the continuous photography is continued.

To interrupt the continuous photography, the main switch 32 or the release switch 33 is opened to interrupt the current to flow through the control circuit. Then the electromagnet 55 is de-energized so that the switch 34 is opened in the manner described hereinabove. The motor 46 is stopped and the shaft 58 is stopped at a predetermined angular position.

When the switch 34 is opened, the capacitor 39 is partly discharged through the resistors 38 and 37, the coil 44 and the base of the transistor 42 so that the latter is made conducting. Therefore, the capacitor 39 is completely discharged through the resistor 38 and the collector of the transistor 42.

In the instant embodiment the switch for selecting the single-frame or continuous photography mode is of a transfer type, but it will be understood that a single-throw switch is used when the contacts A and B of the switch 35 are interconnected to each other.

Figure 4:
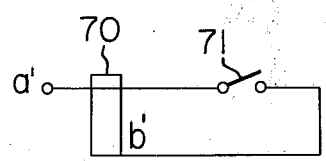
FIG. 4 is a diagram of a remote control circuit used for remote controlling the control circuit shown in FIG. 3.

Remote Control Circuit, FIG. 4

FIG. 4 shows a diagram of a remote control circuit in which reference numeral 70 denotes an adapter connected to the remote control jack 41; and 71, a switch. When the adapter 70 is connected to the remote control jack 41, the contacts a and b are connected to the contacts a' and b', respectively, while the contact c is moved away from the contact a. When the main switch 32 is closed while the release switch 33 is also closed, the remote control may be effected by closing or opening the switch 71.

In the first embodiment described hereinbefore, the electromagnet is energized by two solenoid coils whose resistance values are different from each other. The solenoid with a smaller resistance value is connected to the transistor so that the latter is controlled by the current flowing through the capacitor in case of single-frame photography so as to flow a pulse current through the solenoid with a small resistance for a predetermined time to drive the motor. In case of continuous photography, a pulse current is made to flow through the solenoid with a small resistance simultaneously when current is made to flow through the solenoid with a larger resistance so that the electromagnet may be energized sufficiently to easily release the stopper means. After the stopper means has been released, the solenoid with a smaller resistance is deenergized while current is made to flow through the solenoid with a larger resistance so that the latter may be sufficiently energized to keep the stopper means released. Therefore, the power consumption may be minimized. Furthermore, the release switch is simple in construction so that it may be connected in parallel or in series to the remote-control jack. Thus, the remote control operation may be much facilitated.

Second Embodiment of Stopper Means, FIGS. 12–17

FIGS. 12–17 shows the mechanical construction of the second embodiment of a stopper means generally indicated by 116 and used in conjunction with the second to fifth embodiments of the electromagnetic release device in accordance with the present invention to be described in more detail hereinafter. The stopper means is adapted to stop the shutter blade always at a predetermined angular position when the motor is stopped.

An electromagnet 108 with solenoids $L_1$ and $L_2$ (not shown) and a core 107 is supported by a yoke 101 which in turn is securely fixed to a cine camera main body 106 with screws 105. A crank-shaped armature 109, which is loosely and swingably fitted into a slit 101a of the yoke 101, has a stopper portion 109a, an intermediate portion 109b and a root portion with branched arms 109c and 109d. The branched arm 109c is provided with a spacer 110 while the branched arm 109d is provided with a hole 109e which engages with one end of a spring 111 whose other end is engaged with a projection 102 extended from the yoke 101. Therefore, the armature 109 is normally biased to rotate about the slit 101a of the yoke 101 in the clockwise direction. A spacer 116 is fixed to the intermediate portion 109b of the armature 109 in opposed relation with the core 107.

Figure 13:
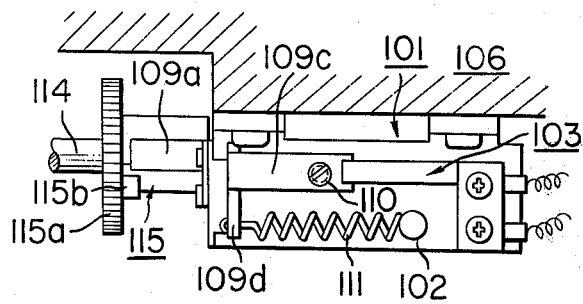
FIG. 13 is an upper-side view of the stopper means shown in FIG. 12.
Figure 15:
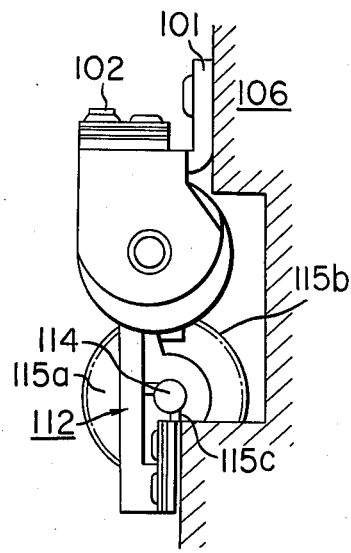
FIG. 15 is a right-side view of the stopper means shown in FIG. 12.
Figure 16:
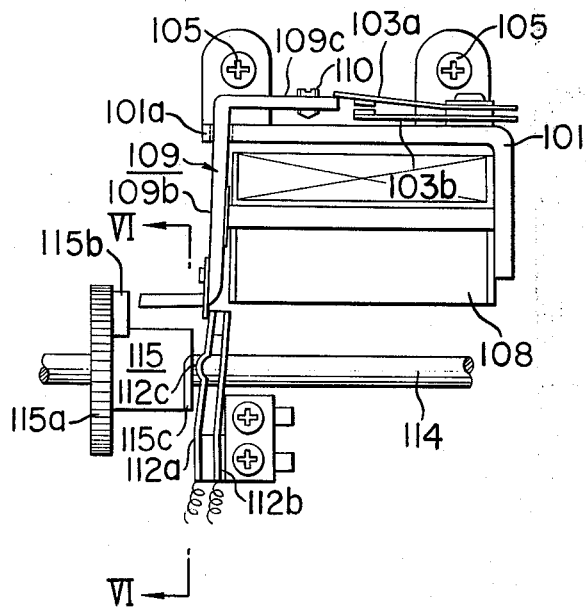
FIG. 16 is a view similar to FIG. 12 with the stopper means released.
Figure 17:
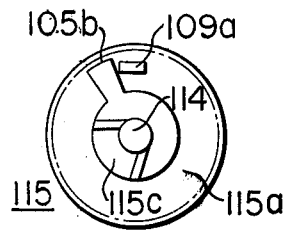
FIG. 17 is a view looking in the direction indicated by the arrow VI—VI in FIG. 16 and illustrating the detail of a cam member of stopper means.

A switch 103 mounted upon the yoke 101 has a pair of contacts 103a and 103b. The contact 103a is actuated by the branched arm 109c of the armature 109 so as to make into contact with or separate from the contact 103b as best shown in FIGS. 13 and 16.

Figure 12:
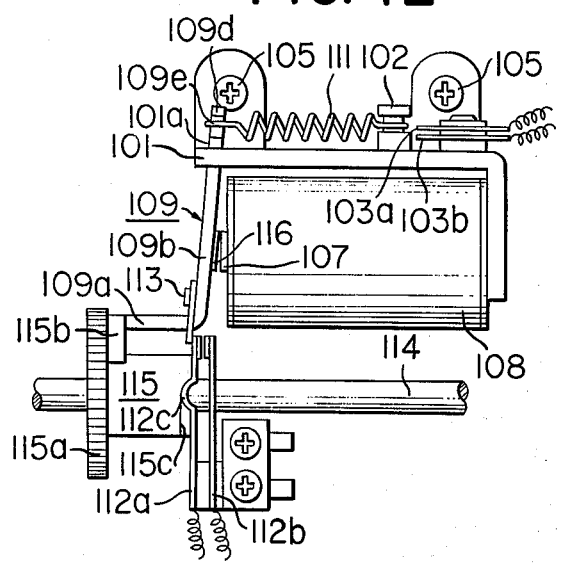
FIG. 12 is a front view of stopper means used with the control circuit shown in FIG. 11.
Figure 14:
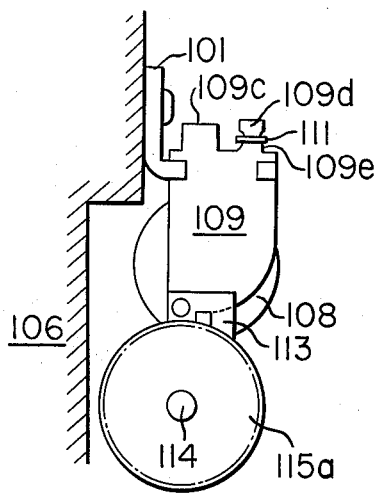
FIG. 14 is a left-side view of the stopper means shown in FIG. 12.

A switch 112 has a pair of contacts 112a and 112b. An actuating member 113 fixed to the armature 109 actuates the contact 112a to make contact with the contact 112b as best shown in FIG. 12 when the armature 109 is attracted by the electromagnet 108. The contact 112a is provided with a projection or curved portion 112c.

A shutter blade shaft 114 carrying a shutter blade (not shown) also carries a gear 115a and a stopper cam member 115 with a stopper 115b for engagement with the stopper portion 109a of the armature 109 and a cam groove 115c for engagement with the projection 112c of the contact 112a.

When the switch 112 is opened, the projection 112c of the contact 112a engages with the cam groove 115c so that the shutter blade shaft 114 may be stopped at a predetermined angular position and the reverse rotation of the stopper cam member 115 due to the impact of its stopper 115b against the stopper portion 109a of the armature 109 may be prevented.

When no current flows through the solenoids $L_1$ and $L_2$ of the electromagnet 108, the latter is of course de-energized as shown in FIG. 12 so that the root portion of the armature 109 is attracted toward the yoke 101 under the force of the spring 111 while the stopper portion 109a is moved away from the yoke 101. As a result, the contact 103a of the switch 103 is pressed down by the branched arm 109a at the root of the armature 109 and is put into contact with the contact 103b. Therefore, the switch 103 is closed. The stopper portion 109a of the armature 109 is in engagement with the stopper 115b while the projection 112c of the contact 112a is put into engagement with the cam groove 115c of the cam member 115 so that the switch 112 is opened.

Second to Fifth Embodiments FIGS. 11, 18, 19 and 20

In FIGS. 11, 18, 19 and 20, common reference numeral 121 denotes a power supply; 122, a main switch; 123, a release switch; 124 and 125, solenoids $L_1$ and $L_2$, respectively, of the electromagnet 108 of the stopper means 116; 103 and 112, the switches thereof; 126, a driving motor; and 152, a remote-control jack. The solenoid 124 has a resistance smaller than the solenoid 125. The above components parts are common in the second to fifth embodiments and are similar in function.

Figure 11:
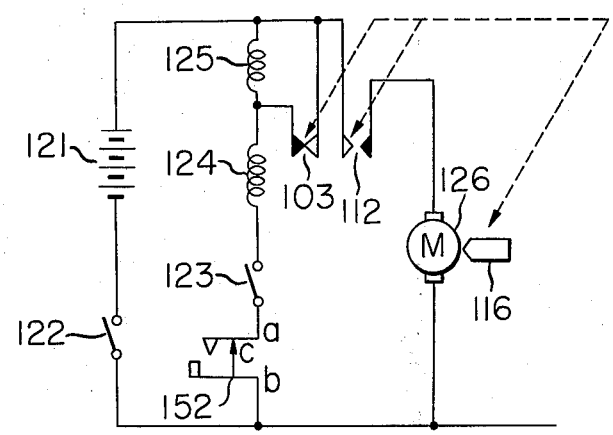
FIG. 11 is a diagram of a second embodiment of a control circuit in accord with the present invention.

Second Embodiment, FIG. 11

Next referring to FIG. 11, the mode of operation of the second embodiment will be described in detail hereinafter. When the main switch 122 is closed while the release switch 123 is also closed, a large current flows through the solenoid 124 with a small resistance and the switch 103. Therefore, the electromagnet 108 is energized so that the intermediate portion 109b of the armature is attracted toward the core 107 against the spring 111. As a result, the stopper portion 109a of the armature 109 is released from the stopper 115b of the cam member 115 while the contact 112a is displaced by the actuating member 113 into contact with the contact 112b. Thus, the switch 112 is closed so that the motor 126 is driven to rotate the shutter blade shaft 158. The root portion of the armature 109 is moved away from the yoke 101 as the armature 109 is attracted so that the contact 103a of the switch 103 is moved away from the contact 103b. Thus, the switch 103 is opened. Then a small current flows through the solenoids 124 and 125 so that the electromagnet 108 may be energized sufficiently to keep attracting the armature 109.

When the main switch 122 or release switch 123 is opened, no current flows into the control circuit so that the electromagnet 108 is de-energized. The armature 109 is returned to its initial position under the force of the spring 111 so that the stopper portion 109a engages again with the stopper 115b while the projection 112c of the contact 112a of the switch 112 engages again with the cam groove 115c. Thus, the switch 112 is opened so that the motor 126 is stopped and the shaft 114 is stopped at a predetermined angular position.

Figure 18:
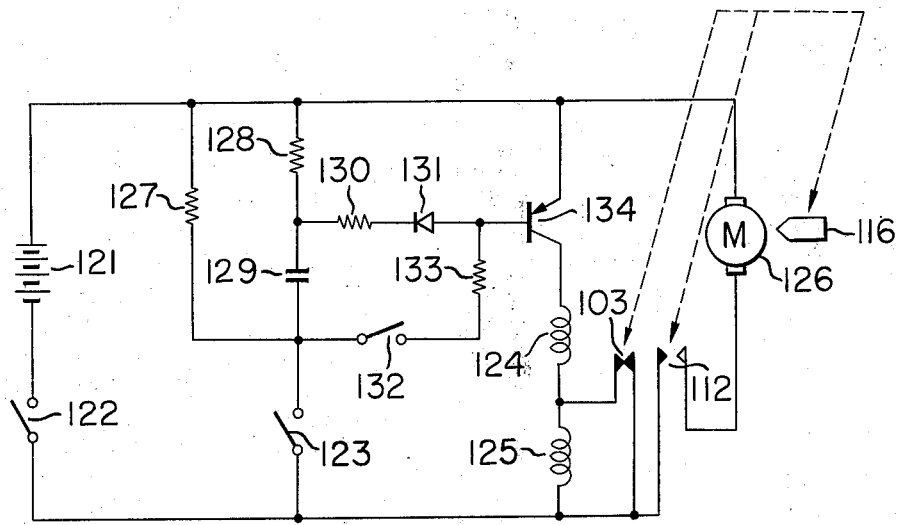
FIG. 18 is a diagram of a third embodiment of a control circuit in accord with the present invention used with stopper means shown in FIG. 12.

Third Embodiment, FIG. 18

The third embodiment shown in FIG. 18 is an improvement of the second embodiment described hereinabove with reference to FIG. 11 so that single-frame photography or continuous photography may be arbitrarily selected. In addition to the common component parts, the third embodiment further comprises resistors 127, 128, 130 and 133, a capacitor 129, a diode 131, a transistor 134, and a selection switch 132 for selecting the single-frame photography mode or the continuous photography mode. More particularly, the switch 132 is opened in case of single-frame photography while it is closed in case of continuous photography mode.

In case of single-frame photography, the switch 132 is opened while the main switch 122 and the release switch 123 are closed. Thus, the transistor 134 is rendered conductive and the large current flows from the power supply 121 through the transistor 134 and the solenoid 124. The electromagnet 108 is therefore energized to attract the armature 109 against the spring 111. Thus, as with the case of thhe secong embodiment, the stopper portion 109a is released from the stopper 115b of the cam member 115 while the contact 112a is put into contact with the contact 112b. Thus, the switch 112 is closed. The contact 103a of the switch 103 is moved away from the contact 103b so that the switch 103 is opened. Therefore, current now flows through both the solenoids 124 and 125, but the current is decreased in magnitude because of the combined resistance of the solenoids 124 and 125 so that the electromagnet 108 is energized to such an extent as to keep attracting the armature 109. Since the transistor 134 has been made conducting, a large current flows through the base of the transistor 134 to charge the capacitor 129. When the capacitor 129 is charged, the transistor 134 is rendered non-conductive and thus no current flows through the solenoids 124 and 125. The control circuit is so designed that when one single-frame photography is completed, the capacitor 129 is completely charged. When no current flows through the solenoids 124 and 125, the electromagnet 108 is de-energized so that the armature 109 is returned to its initial position under the force of the spring 111. The stopper portion 109a engages again with the stopper 115b of the cam member 115 while the contact 112a is moved away from the contact 112b and the projection 112c of the contact 112a engages again with the cam groove 115c. The switch 112 is opened so that the motor 126 is stopped and the shaft 114 is stopped at a predetermined angular position.

When one single-frame of photography is completed, the switch 103 is opened and the capacitor 129 is discharged through the resistors 127 and 128.

In case of continuous photography, the selection switch 132, the main switch 122 and the release switch 123 are all closed. The transistor 134 is rendered conductive and thus a large current flows from the power supply 121 through the transistor 134, the resistor 133, and the switches 132 and 123. When the current flows through the solenoid 124, the switching means 116 is actuated in a manner substantially similar to that described above so that the switch 103 is opened while the switch 112 is closed. Therefore the motor 126 is driven. Since the selection switch 132 is closed, a circuit different from the control circuit for the single-frame photography mode is established, and the transistor 134 is kept conducting. The current flowing out of the transistor 134 into the solenoids 124 and 125 is decreased in magnitude to such an extent that the electromagnet 108 can only keep attracting the armature 109.

To interrupt the continuous photography mode, the main switch 122 or release switch 123 is opened to interrupt the current flowing through the control circuit. Then, the electromagnet 108 is de-energized and the stopper or switching means 116 is actuated in the same manner as described with reference to the single-frame photography mode. Therefore, the switch 112 is opened to stop the motor 126, thereby stopping the shaft 114 at a predetermined angular position.

Figure 19:
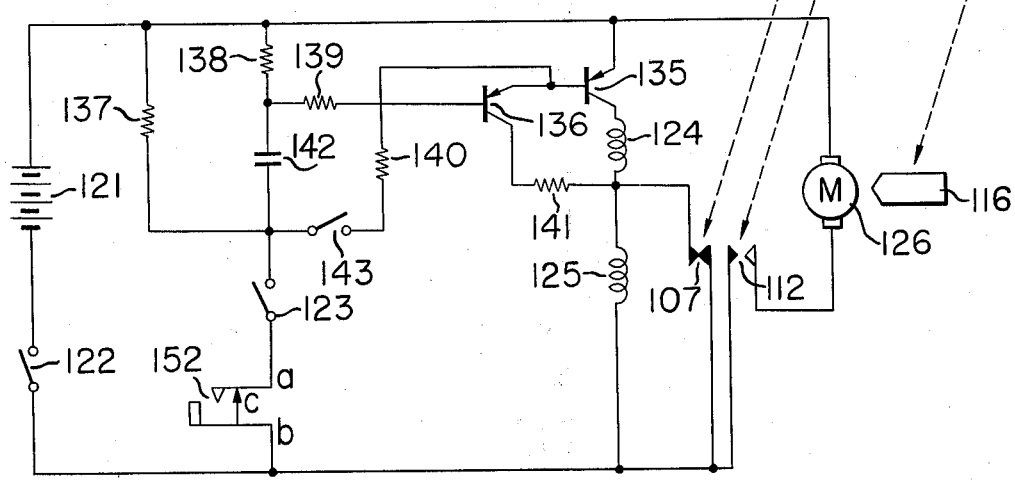
FIG. 19 is a diagram of a fourth embodiment of a control circuit used with the stopper means shown in FIG. 12.

Fourth Embodiment, FIG. 19

FIG. 19 is a diagram of the fourth embodiment of a control circuit for an electromagnetic release device. The fourth embodiment further comprises a remote control jack 152; and PNP transistor 135, a PNP transistor 136, resistors 137, 138, 139, 140 and 141, a capacitor 142 and a selection switch for selecting single-frame photography mode or continuous photography mode. More particularly, the selection switch 142 is opened in case of single-frame photography and is closed in case of continuous photography mode.

In case of the single-frame photography mode, the switch 143 is opened while the main switch 122 and the release switch 123 are closed. A large current flows from the power supply 121 through the transistors 135 and 136, the resistor 139, the capacitor 142, the release switch 123 and the jack 152 so that the capacitor 142 is charged. The current also flows through the solenoid 124 of the stopper means 116 and the switch 103. The stopper means 116 is therefore released so that the motor 126 is driven to rotate the shaft 114.

The control circuit is so designed that when one single-frame of photography is completed the capacitor 142 is fully charged. As soon as the capacitor 142 is charged, no current flows through the solenoids 124 and 125 so that the electromagnet 108 is de-energized. The stopper means 116 is therefore returned to its initial state so that the motor 126 is stopped and the shaft 114 is stopped at a predetermined initial angular position. Thus, one single-frame of photography is completed.

When the switch 112 is opened as single-frame photography is completed, the capacitor 142 is partly discharged through the resistors 137 and 138 so that both transistors 135 and 136 are made conducting again.

In case of the continuous photography mode, the selection switch 143 is closed while the main switch 122 and the release switch 123 are also closed. The transistor 135 is rendered conductive and the large current flows from the power supply 121 through the transistor 135, the resistor 140, the switches 143 and 123 and the jack 127 and also through the solenoid 124 and the switch 107. The stopper means 116 is actuated in the same manner as described above so that the switch 112 is closed while the switch 107 is opened. Therefore the current now flows through both solenoids 124 and 125 and is decreased in magnitude as the combined resistance of the solenoids 124 and 125 becomes larger. Therefore, the electromagnet 108 is energized to such an extent as to only keep attracting the armature 109. Thus continuous photography may be carried out.

To interrupt continuous photography, the main switch 122 or release switch 123 is opened to interrupt the current flowing through the control circuit. Therefore, the electromagnet 108 is de-energized so that the stopper means 116 is returned to its initial state. The switch 112 is opened so that the motor 126 is stopped and the shaft 114 is stopped at the same initial angular position.

In the second, third and fourth embodiments, two solenoids with different resistance are connected in series to each other and the series-connected solenoids are connected in series to the driving motor. When the motor is started, a large current is made to flow only through the solenoid with a higher resistance so that attracting force of the electromagnet may be increased so as to easily release the stopper means. Once the motor is started, a small current flows through the series-connected solenoids because of the combined resistance thereof. That is, the current is decreased in magnitude to energize the electromagnet to such an extent only sufficient to attract the armature. Therefore, the power consumption may be minimized. Furthermore, the shutter blade may be stopped at a predetermined position when the motor is stopped, and the remote control may be much facilitated.

Figure 20:
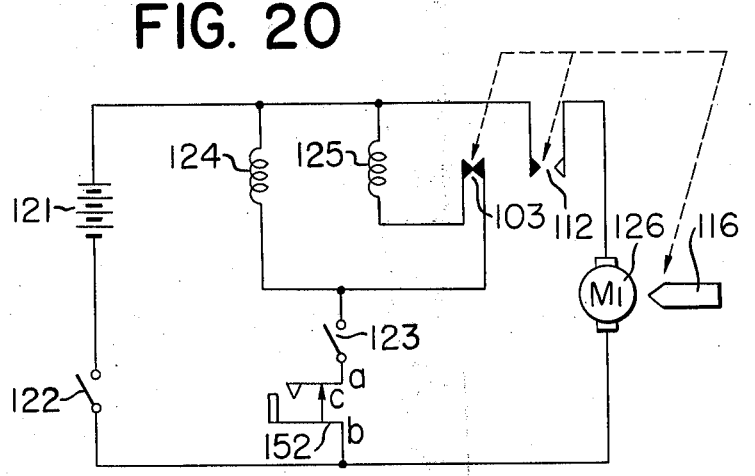
FIG. 20 is a diagram of a fifth amendment of a control circuit used with stopper means shown in FIG. 12.

Fifth Embodiment, FIG. 20

Next the fifth embodiment shown in FIG. 20 will be described. When the main switch 122 and the release switch 123 are closed, a large current flows through the solenoid 125 with a small resistance, the switch 103 and the release switch 123. The electromagnet 108 is energized so that the intermediate portion 109b of the armature 109 is attracted toward the core 107 against the spring 111. The stopper portion 109a of the armature 109 is released from the stopper 115b of the cam member 115, and the contact 112a is caused to make contact with the contact 112b. Thus, the switch 112 is closed so that the motor 126 is driven to rotate the shaft 158. The contact 103a of the switch 103 is moved away from the contact 103b so that the switch 103 is opened. The current flows through the solenoid 124, the release switch 123 and the jack 152 and through the switch 112 and the motor 126. Even though no current flows through the solenoid 125, a small current flows through the solenoid 124 with a higher resistance so that the electromagnet 107 may be energized only sufficiently to keep attracting the armature 109. Thus, continuous photography may be carried out.

To interrupt continuous photography, the main switch 122 or release switch 123 is opened to interrupt the current flowing through the control circuit. Then the electromagnet 108 is de-energized so that the armature 109 is returned to its initial position under the force of the spring 111. The stopper portion 109a of the armature 109 engages again with the stopper 115b, and the projection 112c of the contact 112a engages also with the cam groove 115c. Thus, the switch 112 is opened so that the motor 112 is stopped and the shutter blade shaft 114 is stopped at the initial angular position.

Figure 21:
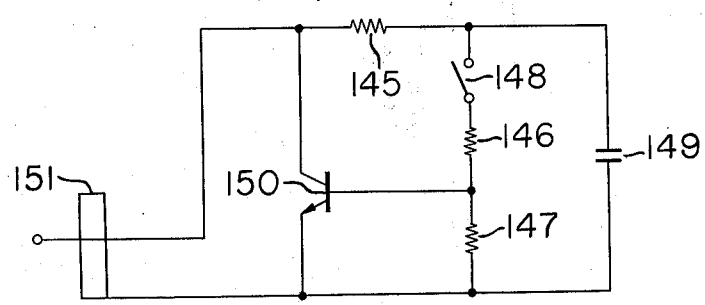
FIG. 21 a diagram of a remote control circuit used with the control circuit shown in FIG. 20 in order to remote control the single-frame photography.
Figure 22:
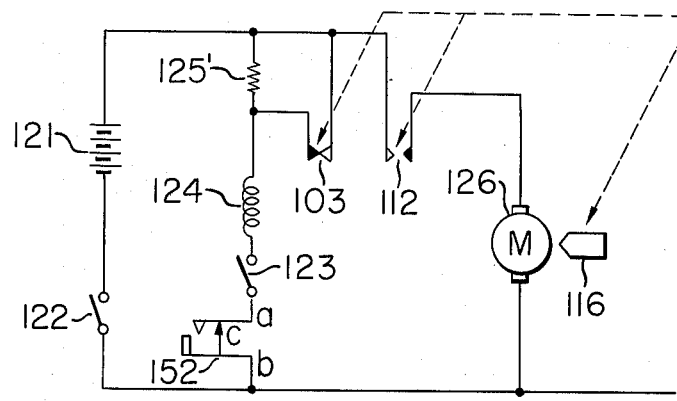
FIGS. 22 to 25 are diagrams of variations of the control circuits shown in FIGS. 11, 18, 19 and 20, respectively, in which instead of the solenoid 125 a resistor 125 is used.
Figure 23:
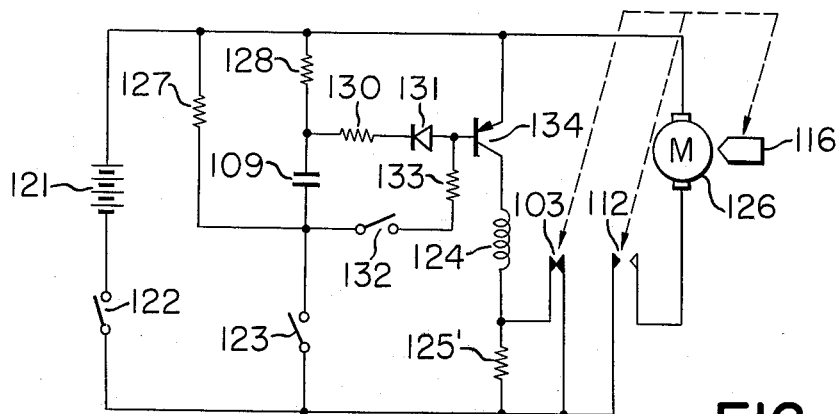
Figure 24:
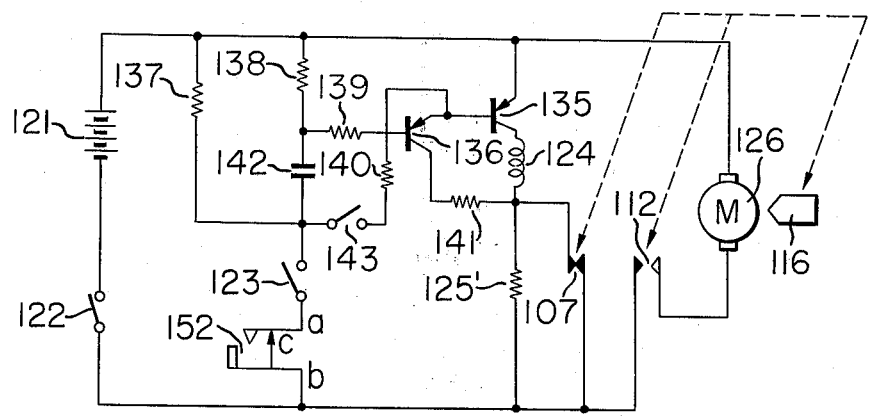
Figure 25:
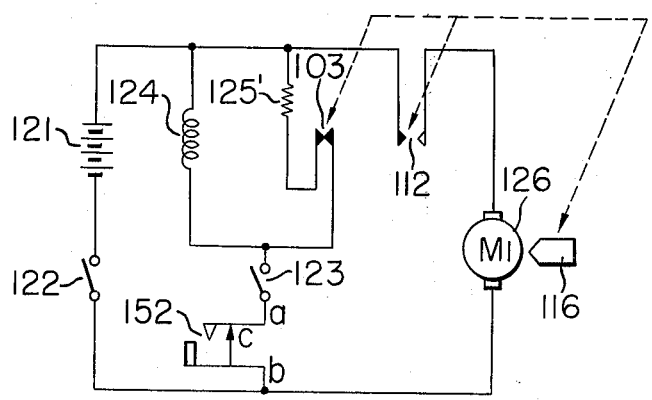

Remote-Control Circuit, FIG. 21

FIG. 21 shows a diagram of a remote control circuit used in conjunction with the second, fourth or fifth embodiment described hereinbefore with reference to FIGS. 11, 19 and 20 in order to remote-control single-frame photography.

The remote control circuit comprises an adapter 151 connected to the remote control jack 152, resistors 145, 146 and 147, a switch 148 for single-frame photography, a capacitor 149 and an NPN transistor 150. The value of the resistor 145 is so selected that when the switch 148 is opened, the current flowing through the remote control circuit may be sufficiently minimized so as not to energize the solenoids 124 and 125. Therefore, the stopper means 116 is not released. The value of the resistor 147 is sufficiently higher than that of the resistor 146.

Next the mode of operation will be described when the remote control circuit is connected with the second embodiment shown in FIG. 11. When the remote control circuit is connected to the remote control jack 152, the contacts a and b are made into contact with the contacts, respectively, while the contact c is moved away from the contact a. When the main switch 122 and the release switch 123 are closed, the current flows through the switch 103, the solenoid 125 with the resistance smaller than that of the solenoid 124, the release switch 123 and the resistor 145 into the capacitor 149 so that the latter is charged. Since the value of the resistor 145 is sufficiently high, the current flowing through the solenoid 125 is very small so that the electromagnet 108 is energized to such an extent as to keep attracting the armature 109. Since the external potential is high, the transistor 150 is cut off.

When the capacitor 149 is sufficiently charged, the switch 148 is closed so that the capacitor 149 is discharged through the switch 148, the resistor 146 and the transistor 150. The transistor 150 is made conducting so that the circuit between the jack contacts through, the transistor 150 is established. Therefore, a large current flows through the switch 103, the solenoid 125, the release switch 123 and the transistor 150. Therefore, the stopper means 116 is released in the manner described above so that the motor 126 is rotated to rotate the shutter blade shaft 114.

When the capacitor 149 is discharged, the transistor 150 is turned off so that the current flows through the solenoid 125, the release switch 123 and the resistor 145 into the capacitor 149. Since the resistance of the resistor 148 is high, the current flowing through the above circuit is decreased in magnitude. The current flowing through the solenoids 124 and 125 is also decreased in magnitude so that the stopper means 116 is returned to its initial stage. The motor 126 is therefore stopped and the shutter blade shaft 114 is stopped at the initial angular position. Thus, one single-frame photography is completed.

The control circuit of the fifth embodiment may be also used in conjunction with the remote control circuit shown in FIG. 21. The adapter 151 of the control circuit is connected to the remote control jack 152 of the control circuit so that the contacts a and b are made into contact with the contacts and, respectively, while the contact c is moved away from the contact a. When the main switch 122 and the release switch 123 are closed, the current flows through the solenoid with a resistance smaller than that of the solenoid 124, the release switch 123 and the resistor 145 into the capacitor 149 so that the latter is charged. Since the value of the resistor 145 is sufficiently high, the current flowing through the solenoids 124 and 125 is very small so that the electromagnet 108 is not sufficiently energized to attract the armature 109. Therefore, the stopper means 116 is not released, and the NPN transistor 150 is not conducted as the external potential is high.

When the switch 148 is closed when the capacitor 149 is sufficiently charged, the capacitor 149 is discharged through the switch 148, the resistor 146 and the transistor 150. The transistor 150 is turned on so that circuit between the jack contacts through, the transistor 150 is established. Therefore, a large current flows through the switch 103, the solenoid 125, the release switch 123 and the transistor 150.

The electromagnet 108 is therefore energized to release the stopper means 116 in the manner described hereinbefore so that the switch 103 is opened while the switch 112 is closed. Therefore, the motor 126 is driven to rotate the shaft 114.

When the switch 103 is opened, no current flows through the solenoid 124 with a high resistance so that the electromagnet 108 may be kept energized to keep attracting the armature 109.

When the capacitor 149 is discharged, the transistor 150 is turned off so that the current flows through the solenoid 125, the release switch 123 and the resistor 145 into the capacitor 149. Since the value of the resistor 145 is very high, the current is very small. Therefore, the current flowing through the solenoid 124 is very small so that the electromagnet 108 is not sufficiently energized to keep attracting the armature 109. Therefore, the stopper means is returned to its initial state in the manner described hereinbefore so that the motor is stopped and the shutter blade shaft 114 is stopped at the initial angular position. Thus, one single-frame photography is completed.

Modified Embodiment FIGS. 22–25

In the second, third, fourth and fifth embodiments of the present invention, two solenoids with different resistance are used, but it will be understood that one of the two solenoids may be replaced by a resistor as shown in FIGS. 22, 23, 24 and 25. That is, instead of the solenoid 125, a resistor 1125' is inserted, but the mode of operation is substantially similar to that described hereinbefore.

As described hereinbefore, according to the present invention the solenoid with a smaller resistance is connected in series to the motor while the solenoid with a higher resistance is connected in parallel with the motor so that only when the motor is started, a large current may flow through the solenoid with a smaller resistance to facilitate the release of the stopper means. Once the stopper means has been released, no current flows through the solenoid with a smaller resistance, but a small current flows through the solenoid with a higher resistance so that the electromagnet may be sufficiently energized to keep attracting the armature. Therefore, the power consumption may be minimized. Furthermore, the shutter is ensured to be stopped always at a predetermined angular position when the motor is stopped. Moreover, the remote control may be effected by a device very simple in construction.

We claim:

1. A photographic camera comprising:
   a motor for operating said camera, said motor rotating upon receipt of current supplied from an electric power source housed in said camera;
   shutter control means (114, 115c) for controlling operation of a shutter, said shutter control means being actuated by a driving force from said motor when said motor rotates;
   blocking means comprising stopper means (115b) provided on said shutter control means rotating in cooperation therewith, and actuating means (109) selectively movable between a blocking position at which said actuating means is engaged with said stopper means so that operation of said shutter control means is stopped and an unblocking position at which said actuating means is not engaged with said stopper means so that operation of said shutter control means is not stopped;
   first switching means (112) electrically connected in series with said motor for selectively supplying current from said source to said motor, said first switching means being mechanically linked with said actuating means so as to supply current from said source to said motor when said actuating means is at its unblocking position;
   electromagnet means (108) having at least first and second electromagnet circuits (124, 125—FIG. 20), said electromagnet means being located in a position from which said actuating means is magnetically affectable thereby, so as to control the movement of said actuating means;
   second switching means (103) for inhibiting supply of the current from said source to said second electromagnet circuit when said first switching means is activated, said second switching means being mechanically linked with said actuating means, and electrically connected so as to switch said second electromagnet circuit selectively into and out of parallel connection with said first electromagnet circuit;
   whereby power dissipation in the utilization of said camera is reduced.

2. A photographic camera according to claim 1 wherein said actuating means includes means (111) for originally retaining said actuating means itself at the blocking position.

3. A photographic camera according to claim 1 wherein each of said first and second electromagnet circuits respectively includes an electromagnetic coil, the electromagnetic coil of said first electromagnet circuit having an internal resistance greater than that of said second electromagnet circuit.

4. A photographic camera according to claim 1 wherein said first switching means includes an electric contact (112a) movable in cooperation with the movement of said actuating means, said shutter control means has an engagement member (115c) adapted to engage with said electric contact, and such engagement mechanically prevents said stopper means from rebounding in response to an impact force developed when said actuating means engages with said stopper means.

5. A photographic camera comprising:
   a motor for operating said camera, said motor rotating upon receipt of a supplied current from an electric power source provided in said camera;
   shutter control means (58) for controlling operation of a shutter, said shutter control means being actuated by a driving force from said motor when said motor rotates;
   blocking means comprising stopper means (47b) provided on said shutter control means for cooperating therewith and actuating means (109) selectively movable between a blocking position at which said actuating means is engaged with said stopper means so that operation of said shutter control means is stopped and an unblocking position at which said actuating means is not engaged with said stopper means so that operation of said shutter control means is not stopped;
   a first switching means (34) electrically connected in series with said motor for selectively supplying current from said source to said motor, said switching means being mechanically linked with said actuating means so as to supply the current from said source to said motor when said actuating means is at its unblocking position;

electromagnet means (55) having at least first and second electromagnet circuits (44, 45), said electromagnet being located in a position from which said actuating means is magnetically affectable thereby, so as to control the movement of said actuating means;

second switching means (43) for inhibiting supply of the current from said source to said second electromagnet circuit following the lapse of a predetermined time after the shutter is operated, said second switching means being electrically connected so as to switch said second electromagnet circuit selectively into and out of parallel connection with said first electromagnet circuit.

6. A photographic camera according to claim 5 wherein said second switching means comprises an RC time constant circuit (37, 38, 39) and a transistor (43).

7. A photographic camera according to claim 5 wherein said actuating means includes means (65) for originally retaining said actuating means itself at the blocking position.

8. A photographic camera according to claim 5 wherein each of said first and second electromagnet circuits respectively includes an electromagnetic coil, the electromagnetic coil of said first electromagnet circuit having an internal resistance greater than that of said second electromagnet circuit.

9. A photographic camera according to claim 5 wherein said first switching means includes an electric contact (112a) movable in cooperation with the movement of said actuating means, said shutter control means has an engagement member (115c) adapted to engage with said electric contact, and such engagement mechanically prevents said stopper means from rebounding in response to an impact force developed when said actuating means engages with said stopper means.

10. An improved camera release system adapted to selectively switch photography modes between a continuous mode and a single-frame mode, said system comprising:

a motor for operating said camera, said motor rotating upon receipt of a current supplied from an electric power source provided in the camera;

shutter control means (58) for controlling operation of a shutter, said shutter control means being actuated by a driving force from said motor when said motor rotates;

blocking means comprising stopper means (47b) provided on said shutter control means rotating in cooperation therewith and actuating means (109) selectively movable between a blocking position at which said actuating means is engaged with said stopper means so that operation of said shutter control means is stopped and an unblocking position at which said actuating means is not engaged with said stopper means so that operation of said shutter control means is not stopped;

a first switching means (34) electrically connected in series with said motor for selectively supplying current from said source to said motor, said switching means being mechanically linked with said actuating means so as to supply current from said source to said motor when said actuating means is at the unblocking position;

electromagnet means (55) having at least first and second electromagnet circuits (44, 45) electrically connected in parallel with each other, said electromagnet means being located in a position from which said actuating means is magnetically affectable thereby, so as to control the movement of said actuating means;

a second switching means (43) for inhibiting supply of the current from said source to said second electromagnet circuit following the lapse of a predetermined time after the shutter is operated, said second switching means being electrically connected so as to switch said second electromagnet circuit selectively into and out of parallel connection with said first electromagnet circuit;

mode switching means (35) for selectively switching the photography modes between the continuous mode and the single-frame mode, said mode switching means causing said first electromagnet circuit (44) to be switched into electrically effective or ineffective condition;

whereby, in the continuous photography mode, the current supplied to said second electromagnet circuit is inhibited by said second switching means following the lapse of a predetermined time after the shutter is operated, and current is thereafter supplied only to said first electromagnet circuit, so that power dissipation in said camera release system is reduced.

11. An improved camera release system according to claim 10 wherein said second switching means comprises an RC time constant circuit (37, 38, 39) and a transistor (43).

12. An improved camera release system according to claim 10 wherein said mode switching means comprises a mechanical switch for selectively switching the photography modes between the continuous mode position (A) and the single-frame mode position (B).

13. An improved camera release system according to claim 10 wherein said actuating means includes means (65) for originally retaining said actuating means itself at the blocking position.

14. An improved camera release system according to claim 10 wherein each of said first and second electromagnet circuits respectively includes an electromagnetic coil, the electromagnetic coil of said first electromagnet circuit having an internal resistance greater than that of said second electromagnet circuit.

15. An improved camera release system according to claim 10 wherein said first switching means includes an electric contact (112a) movable in cooperation with the movement of said actuating means, said shutter control means has an engagement member (115c) adapted to engage with said electric contact, and such engagement mechanically prevents said stopper means from rebounding in response to an impact force which is developed when said actuating means engages with said stopper means.

16. A photographic camera comprising:

a motor for operating said camera, said motor rotating upon receipt of current supplied from an electric power source provided in the camera;

shutter control means (114, 115c) for controlling operating of a shutter, said shutter control means being actuated by a driving force from said motor when said motor rotates;

blocking means comprising stopper means (115b) provided on said shutter control means rotating in cooperation therewith and actuating means (109) selectively movable between a blocking position at which said actuating means is engaged with said stopper means so that operation of said shutter control means is stopped and an unblocking position at which said actuating means is not engaged with said stopper means so that operation of said shutter control means is not stopped;

first switching means (112) electrically connected in series with said motor for selectively supplying current from said source to said motor, said switching means being mechanically lined with said actuating means so as to supply current from said source to said motor when said actuating means is in its unblocking position;

electromagnet means (108) electrically connected in series with said source having at least an electromagnet circuit (124) and a resistance circuit (125, 125' of FIGS. 11, 18, 22, 23), said electromagnet means being located in a position in which said actuating means is magnetically affectable thereby, so as to control the movement of said actuating means;

second switching means electrically connected in parallel with said resistance circuit and in series with said electromagnet circuit for forming a by-pass circuit across said resistance circuit, said second switching means being mechanically linked with said actuating means and opening the by-pass circuit when said first switching emans is fully actuated;

whereby power dissipation in the utilization of the camera is reduced.

17. A photographic camera according to claim 16 wherein said actuating means includes means (111) for originally retaining said actuating means itself at the blocking position.

18. A photographic camera according to claim 16 wherein said resistance circuit comprises an electromagnet coil (125).

19. A photographic camera according to claim 18 wherein said electromagnet circuit comprises an electromagnet coil (124).

20. A photographic camera according to claim 19 wherein the electromagnet coil of said resistance circuit has a greater internal resistance than that of said electromagnet circuit.

21. A photographic camera according to claim 16 wherein said electromagnet means further has third switching means (134, FIG. 18) electrically connected in series with said source, said third switching means controlling the time during which current is supplied to said electromagnet means.

22. A photographic camera according to claim 21 wherein said third switching means comprises a transistor circuit (134) and RC time constant circuit (128, 129, 130) for defining operation time of said transistor circuit.

23. A photographic camera according to claim 22 wherein said electromagnet means includes mode switching means for originally keeping said transistor circuit turned on by selectively deenergizing said RC time constant circuit.

24. A photographic camera according to claim 16 wherein said first switching means includes an electric contact (112a) movable in cooperation with the movement of said actuating means, said shutter control means has an engagement member adapted to engage with said electric contact, and such engagment mechanically prevents said stopper means from rebounding in response to an impact force developed when said actuating means engages with said stopper means.

25. A release arrangement for a motion picture camera comprising:

a rotary shutter;

a motor for rotating said shutter when the motor is supplied with current from an electric power source in the camera;

shutter control means for transmitting a rotary driving force of said motor to said shutter, said shutter control means being located between said motor and said shutter and mechanically linked with said motor and said shutter, and rotatable by said motor;

blocking means comprising stopper means provided on said shutter control means rotating in cooperation therewith and actuating means selectively movable between locations respectively in and out of the rotational locus of said shutter control means, said actuating means being engageable with said stopper means so as to stop the rotation of said shutter control means, when it is located in the rotational locus of said shutter control means;

electromagnet means for controlling the movement of said actuating means;

switching means electrically connected in series for selectively supplying current from said source to said motor, said switching means being mechanically linked with said actuating means so as to supply the current from said source to said motor when said actuating means is located outside the rotational locus of said shutter control means;

rebound preventing means for preventing said shutter control means from rebounding and reversely rotating in response to impact force developed when said actuating means engages with said stopper means, said rebound preventing means comprising a first engagement member provided on said shutter control means and a second engagement member formed in said switching means, said second member engaging with said first engagement member so as to prevent said shutter control means from reversely rotating when said switching means has stopped the supply of current to said motor.

26. A release arrangement for a motion picture camera comprising:

a rotary shutter;

a motor for rotating said shutter;

shutter control means for transmitting a rotary driving force of said motor to said shutter, said shutter control means being located between said motor and said shutter and mechanically linked with said motor and said shutter, and rotatable by said motor;

blocking means comprising stopper means provided on said shutter control means rotating in cooperation therewith and actuating means selectively movable betwen locations in and out of the rotational locus of said shutter control means, said actuating means being engageable with said stopper means so as to stop the rotation of said shutter control means when it is located in the rotational locus of said shutter control means;

first switching means electrically connected in series with said motor for selectively supplying current from a current source in said camera to said motor, said first switching means being mechanically linked with said actuating means so as to supply current from the source to said motor when said actuating means is located outside of the rotational locus of said shutter control means;

electromagnet means having at least first and second electromagnet circuits electrically connected in parallel with each other, said electromagnet means being located in a position from which said actuating means is magnetically affectable thereby, so as to control the movement of said actuating means;

second switching means for inhibiting supply of the current from said source to said second electromagnet circuit following lapse of a predetermined time after the shutter is operated, said second switching means being electrically connected so as to switch said second electromagnet circuit selectively into and out of parallel connection with said first electromagnet circuit;

mode switching means for selectively switching photography modes between a continuous mode and a single-frame mode, since mode switching means causing said first electromagnet circuit to be switched selectively into electrically effective or ineffective condition, and rebound preventing means for preventing said shutter control means from rebounding and reversely rotating in response to an impact force developed when said actuating means engages with said stopper means, said rebound preventing means comprising a first engagement member provided on said shutter control means and a second engagement member formed in said switching means, and said second member engaging with said first engagement member so as to prevent said shutter control means from reversely rotating when said switching means has stopped the supply of current to said motor.

* * * * *